US009007329B2

(12) United States Patent
Lee et al.

(10) Patent No.: US 9,007,329 B2
(45) Date of Patent: Apr. 14, 2015

(54) LIQUID CRYSTAL DISPLAY DEVICE INCLUDING TOUCH PANEL

(75) Inventors: Deuk Su Lee, Yongin-si (KR); Hye Jin Lee, Gangnam-gu (KR); Hyung Seok Park, Gangseo-gu (KR)

(73) Assignee: LG Display Co., Ltd., Seoul (KR)

( * ) Notice: Subject to any disclaimer, the term of this patent is extended or adjusted under 35 U.S.C. 154(b) by 732 days.

(21) Appl. No.: 12/292,335

(22) Filed: Nov. 17, 2008

(65) Prior Publication Data
US 2010/0066650 A1    Mar. 18, 2010

(30) Foreign Application Priority Data

Sep. 12, 2008  (KR) .......................... 10-2008-0090236

(51) Int. Cl.
| G06F 3/045 | (2006.01) |
| G06F 3/041 | (2006.01) |
| G09G 3/36 | (2006.01) |
| G09G 5/00 | (2006.01) |
| G02F 1/1335 | (2006.01) |
| G02F 1/1333 | (2006.01) |
| G06F 3/044 | (2006.01) |

(52) U.S. Cl.
CPC .......... *G06F 3/0412* (2013.01); *G02F 1/13338* (2013.01); *G06F 3/044* (2013.01); *G06F 2203/04111* (2013.01)

(58) Field of Classification Search
USPC ......................................... 345/156, 173–178
See application file for complete search history.

(56) References Cited

U.S. PATENT DOCUMENTS

| 5,488,204 A * | 1/1996 | Mead et al. ................. 178/18.06 |
| 5,568,292 A | 10/1996 | Kim |
| 6,519,021 B1 * | 2/2003 | Aruga ............................ 349/152 |
| 2003/0103176 A1 * | 6/2003 | Abe et al. ....................... 349/113 |
| 2004/0189587 A1 * | 9/2004 | Jung et al. ....................... 345/102 |
| 2005/0179668 A1 * | 8/2005 | Edwards ....................... 345/173 |
| 2006/0118743 A1 * | 6/2006 | Lang ......................... 250/559.32 |
| 2008/0062140 A1 * | 3/2008 | Hotelling et al. ............. 345/173 |

FOREIGN PATENT DOCUMENTS

WO    WO 2007/146779 A2    12/2007

* cited by examiner

*Primary Examiner* — Kathy Wang-Hurst
*Assistant Examiner* — David Tung
(74) *Attorney, Agent, or Firm* — McKenna Long & Aldridge LLP (57) ABSTRACT

A liquid crystal display device in which a touch panel is embedded in a liquid crystal panel, which reduces the number of processes and eases assembly. The liquid crystal display device includes first and second substrates opposite each other, a thin film transistor array formed on the first substrate, a touch sensing part formed on the second substrate including a plurality of transparent X electrodes, a plurality of transparent Y electrodes orthogonally intersecting each other and a first transparent insulating film between the X electrodes and the Y electrodes, a color filter array formed on the touch sensing part, and a liquid crystal layer formed between the thin film transistor array and the color filter array.

5 Claims, 8 Drawing Sheets

RELATED ART

LIQUID CRYSTAL DISPLAY DEVICE INCLUDING TOUCH PANEL

This application claims the benefit of the Korean Patent Application No. P08-090236, filed on Sep. 12, 2008, which is hereby incorporated by reference for all purposes as if fully set forth herein.

BACKGROUND OF THE INVENTION

1. Field of the Invention

The present invention relates to a liquid crystal display device, and more particularly, to a liquid crystal display device, wherein a touch panel is embedded in a liquid crystal panel, contributing to a reduction in the number of processes and easy assembling.

2. Discussion of the Related Art

As society becomes increasingly information dependent, a display field, wherein electrical information signals are visually displayed, is being developed rapidly. As such, a variety of flat panel display devices having outstanding performances, such as a thin thickness, light weight and low consumption of electricity, have been developed and have rapidly replaced conventional Cathode Ray Tubes (CRTs).

Examples of flat panel display devices include, for example, Liquid Crystal Display (LCD), Plasma Panel Display (PDP), Field Emission Display (FED) and Electro-Luminescence Display (ELD) devices, etc. These devices commonly include, as an essential element, a flat display panel to form an image. The flat display panel is configured such that a pair of transparent insulating substrates is bonded to face each other with an inherent illuminating or polarizing material layer interposed therebetween.

Of the above-mentioned display devices, an LCD device is designed to display an image by adjusting light transmissivity of liquid crystals using an electric field. For this, the LCD device includes a display panel having liquid crystal cells, a backlight unit to irradiate light to the display panel, and drive circuits to drive the liquid crystal cells.

The display panel is provided with a plurality of gate lines and a plurality of data lines, which intersect each other to define a plurality of unit pixel regions. In this case, each pixel region consists of a thin-film transistor array substrate and color filter array substrate opposite each other, spacers located between the two substrates to maintain a cell gap, and liquid crystals filled in the cell gap.

The thin-film transistor array substrate includes the gate lines and data lines, thin-film transistors as switching devices formed at intersections of the gate lines and data lines, pixel electrodes arranged per liquid crystal cell and connected to the thin-film transistors, and an alignment film coated over all the above elements. Signals from the drive circuits are supplied to the gate lines and data lines through respective pads.

The thin-film transistors supply pixel voltage signals, to the pixel electrodes, in response to signals supplied to the data lines and in response to scan signals supplied to the gate lines.

The color filter array substrate includes color filters arranged per liquid crystal cell, a black matrix for division of the color filters and refraction of outside light, a common electrode to commonly supply a reference voltage to the liquid crystal cells, and an alignment film coated over all the above elements.

After the thin-film transistor substrate and color filter array substrate, which are fabricated separately, are aligned, the thin-film transistor substrate and color filter array substrate are bonded to face each other, and liquid crystals are injected and sealed, to thereby complete the display panel.

The demand for the addition of a touch panel to the LCD device fabricated as described above is increasing. A touch panel is designed to sense a touch position of person's hand or other input means and transmit information in response to the sensed touch position. Currently, such a touch panel has been attached to an outer surface of the LCD device.

Hereinafter, a conventional touch panel attached LCD device will be described with reference to the accompanying drawing.

Figure 1:
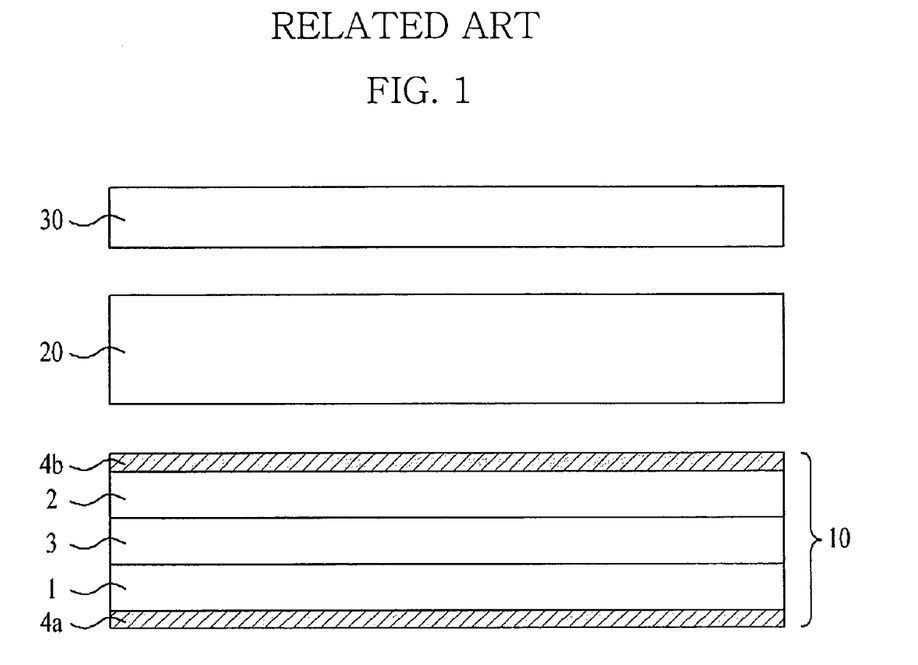
FIG. 1 is a schematic view illustrating a conventional touch panel attached liquid crystal display device.

FIG. 1 is a schematic view illustrating a conventional touch panel attached LCD device.

As shown in FIG. 1, the conventional touch panel attached LCD device includes a liquid crystal panel 10 which consists of first and second substrates 1 and 2 respectively, a liquid crystal layer 3 filled between the substrates 1 and 2 and first and second polarizers 4a and 4b, respectively, attached to rear surfaces of the first and second substrates 1 and 2, a touch panel 20 which is placed on the liquid crystal panel 10 and is driven in a capacitive manner, and a cover glass 30 to protect the top of the touch panel 20.

Provided on the first substrate 1 of the liquid crystal panel 10 is a Thin-Film-Transistor (TFT) array consisting of gate lines and data lines intersecting each other to define pixel regions, TFTs formed at intersections of the gate lines and data lines, and pixel electrodes in the respective pixel regions (not shown).

Provided on the second substrate 2 is a color filter array consisting of a black matrix layer, a color filter layer and a common electrode.

The interior configuration of the touch panel 20 is changed according to a driving manner of the touch panel. For example, in the case of a capacitive touch panel designed to sense a touch position via a capacitance variation at a touch point, first and second electrodes intersecting each other are provided to enable sensing via a capacitance value variation between the electrodes.

To protect the touch panel 20, the cover glass 30 is provided on the top of the touch panel 20.

The above-described conventional touch panel attached LCD device requires an adhesive layer (not shown) between the touch panel 20 and the liquid crystal panel 10 because the touch panel 20 is formed as a sheath of the liquid crystal panel 10. In this case, the liquid crystal panel 10 and touch panel 20 must be fabricated separately, and there is a need for a process for attaching the touch panel 20 and the liquid crystal panel 10 to each other.

Problems of the above-described conventional touch panel attached LCD device will be described.

The touch panel is provided as a sheath of the liquid crystal panel and therefore, an adhesive layer must be provided between the touch panel and the liquid crystal panel. This inevitably requires an additional attachment process. Further, if the touch panel and liquid crystal panel are misaligned, it is difficult to separate the touch panel attached to the liquid crystal panel, and forcible separation may damage the touch panel.

In addition, the attachment of the adhesive layer between the touch panel and the liquid crystal panel has a risk of increasing process time and costs due to an increased number of processes.

With the configuration of the touch panel being attached to the liquid crystal panel, the entire LCD device has a total thickness of at least the touch panel, liquid crystal panel, a module surrounding the liquid crystal panel, and a cover glass. Assuming that such a touch panel attached LCD device is used in small devices such as cellular phones, the thick thickness of the entire LCD device becomes a burden.

SUMMARY OF THE INVENTION

Accordingly, the present invention is directed to a touch panel embedded liquid crystal display device that substantially obviates one or more of the problems due to limitations and disadvantages of the related art.

An advantage the present invention is to provide a touch panel embedded liquid crystal display device wherein a touch panel is embedded in a liquid crystal panel, which reduces the number of processes and eases assembly.

Additional features and advantages, of the invention will be set forth in the description which follows, and in part will be apparent from the description or may be learned from practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a liquid crystal display device comprises, first and second substrates opposite each other; a thin film transistor array formed on the first substrate; a touch sensing part formed on the second substrate and includes a plurality of transparent X electrodes, a plurality of transparent Y electrodes orthogonally intersecting each other and a first transparent insulating film between the X electrodes and the Y electrodes; a color filter array formed on the touch sensing part; and a liquid crystal layer formed between the thin film transistor array and the color filter array.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE INVENTION

Reference will now be made in detail to the embodiments of the present invention, examples of which are illustrated in the accompanying drawings.

Hereinafter, a touch panel embedded liquid crystal display device and a method for manufacturing the same according to the present invention will be described in detail with reference to the accompanying drawings.

Figure 2:
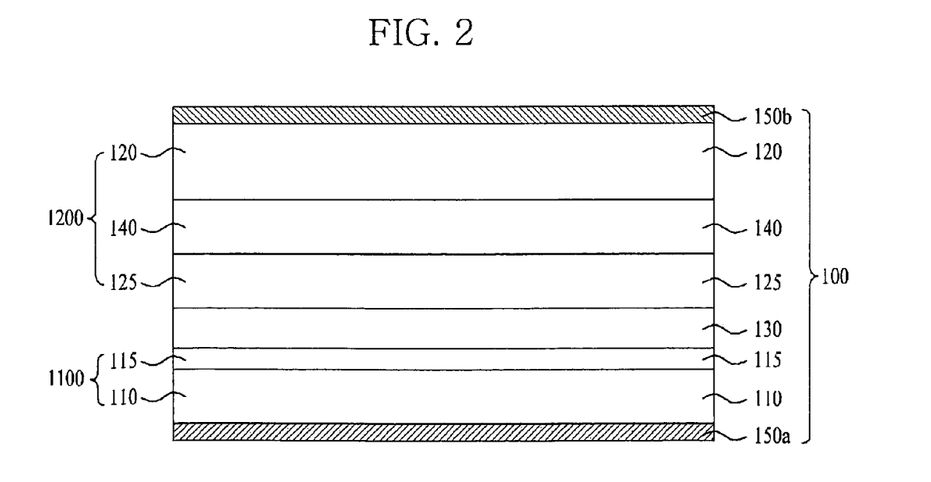
FIG. 2 is a sectional view illustrating a touch panel embedded liquid crystal display device according to the present invention.

FIG. 2 is a sectional view illustrating a touch panel embedded liquid crystal display device according to the present invention.

As shown in FIG. 2, the touch panel embedded liquid crystal display device of the present invention includes a thin film transistor array substrate 1100 and color filter array substrate 1200 opposite each other, a liquid crystal layer 130 filled between the thin film transistor array substrate 1100 and the color filter array substrate 1200, and first and second polarizers 150a and 150b, respectively, provided at rear surfaces of the thin film transistor array substrate 1100 and color filter array substrate 1200.

The thin film transistor array substrate 1100 includes a first substrate 110, and a thin film transistor array 115 formed on the first substrate 110. The thin film transistor array 115 consists of gate lines (not shown) and data lines (not shown) intersecting each other to define pixel regions, pixel electrodes (not shown) formed in the respective pixel regions, and thin film transistors (not shown) formed at intersections of the gate lines and data lines.

The color filter array substrate 1200 includes a second substrate 120, and a touch sensing part 140 and a color filter array 125 which are sequentially formed on the second substrate 120. The color filter array 125 consists of a black matrix layer 1251, a color filter layer 1252 (Red filter: 1252a, Green filter: 1252b and Blue Filter: 1252c), an overcoat layer 1253, and a common electrode 1254 formed over the entire surface of the overcoat layer 1253 (See FIG. 3F).

The touch sensing part 140 consists of a plurality of X electrodes 141 (See FIG. 3B) formed on the second substrate 120 and spaced apart from one another by a predetermined distance in an X-axis direction, a first insulating film 142 formed over the entire surface of the second substrate 120 including the X electrodes 141, Y electrodes 143 (See FIG. 4B) formed on the first insulating film 142 and spaced apart from one another by a predetermined distance in a direction intersecting the X electrodes 141, and a second insulating film 144 formed over the entire surface of the Y electrodes 143.

The X and Y electrodes 141 and 143 of the touch sensing part 140 are transparent electrodes. The first insulating film 142 is made of a transparent organic insulating film to flatten a plane above the X electrodes 141.

The first insulating film 142 has a thickness of 0.1~5 μm, for example, and is made of an organic insulating film, which is transparent like photo-acryl and has a low dielectric constant. The first insulating film 142 serves to flatten a plane after formation of the X-electrodes 141 and also, to prevent an increase in load at the intersections of the X electrodes 141 and Y electrodes 143.

Figure 5:
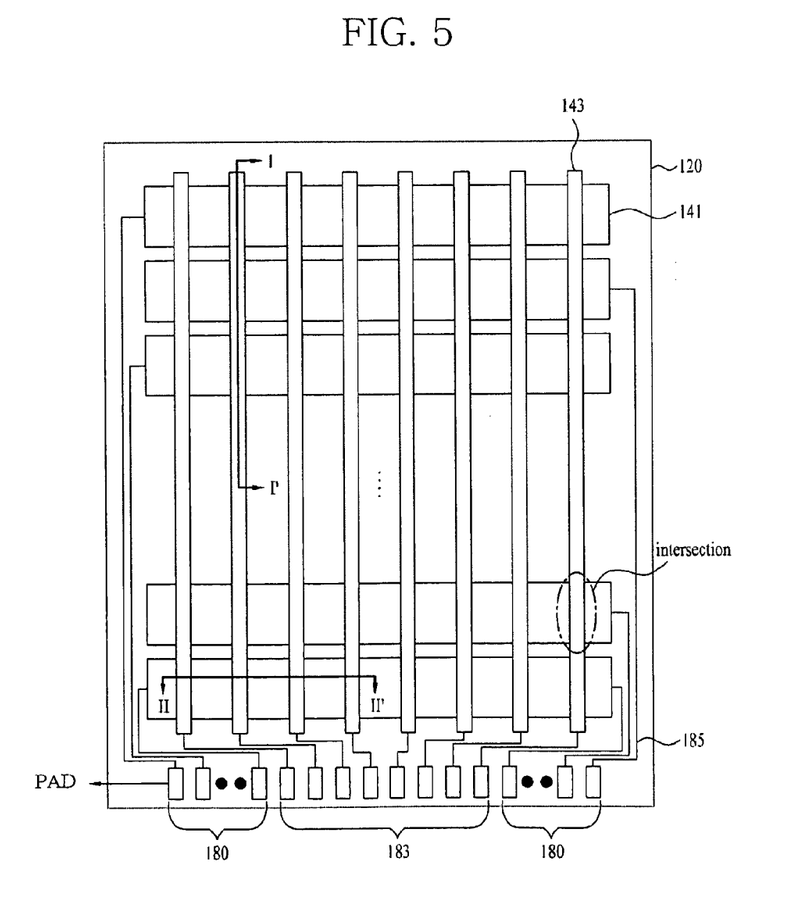
FIG. 5 is a plan view illustrating an upper substrate provided in the touch panel embedded liquid crystal display device according to the present invention.

The X electrodes 141 are bar-shaped electrodes elongated in an X-axis direction (See FIG. 5). The Y electrodes 143 are bar-shaped electrodes elongated in a Y-axis direction to intersect the X electrodes 141 (See FIG. 5). The bar shape of the X electrodes 141 and Y electrodes 143 is exemplary. The X electrodes 141 and the Y electrodes 143 may include shapes other than a bar shape, and may be formed regularly except for the intersections.

Figure 6A:
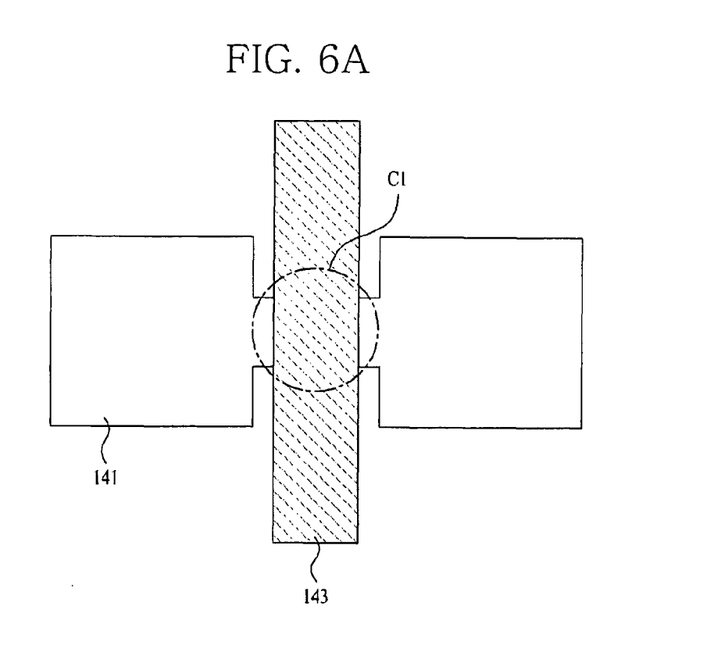
FIGS. 6A and 6B are plan views illustrating a modified form of X and Y electrodes in the liquid crystal display device according to the present invention.

At least one of the X electrode 141 and Y electrode 143 has a thinner width at the intersection than the remaining region thereof (See FIG. 6A). This configuration reduces load between the X electrode 141 and the Y electrode 143 and is advantageous to sense a capacitance between the X electrode 141 and the Y electrode 143 with high sensitivity.

The X electrodes 141 and Y electrodes 143 are made of any one of Indium Tin Oxide (ITO), Indium Zinc Oxide (IZO) and Indium Tin Zinc Oxide (ITZO).

The second insulating film 144 between the touch sensing part 140 and the color filter array 125 may be omitted as occasion demands. However, providing the second insulating film 144 flattens a plane above the Y-electrodes 143 and insulates the touch sensing part 140 from the common electrode 1254 formed at the top of the color filter array 125, thereby preventing a touch sensing operation of the X electrodes 141 and Y electrodes 143 from having an effect on a vertical electric field created between the thin film transistor array 115 and the common electrode 1254.

The first substrate 110 and second substrate 120 include a first region (411, See FIG. 7) and a second region (412, See FIG. 7), respectively, defined in a side region thereof so as not to overlap each other. An image signal applicator 310 is connected to the first region, to apply signals to the thin film transistor array 115. A touch panel signal controller 320 is connected to the second region, to perform voltage application and signal detection with respect to the X and Y electrodes 141 and 143.

Any one of the X electrodes 141 and Y electrodes 143 functions as driving electrodes to which voltages are applied, and the other one functions as sensing electrodes to detect voltage signals. Each of the X and Y electrodes 141 and 143 are connected with a pad (180, See FIG. 5) located at one end thereof.

The touch sensing part 140 sequentially applies voltage signals to the plurality of driving electrodes and detects voltage values at the sensing electrodes, thereby measuring a variation in capacitance between the X electrodes 141 and the Y electrodes 143 upon occurrence of a touch. In this way, the presence of a touch and a touch position can be detected.

A cover glass (300, See FIG. 3F) may be further formed on the second polarizer 150b on the second substrate 120, but as occasion demands, may be omitted when the second substrate 120 has durability against external pressure.

In the above-described touch panel embedded liquid crystal display device of the present invention, a touch sensing operation is accomplished as follows.

If voltages are sequentially applied to the X electrodes 141, a capacitance between the X electrodes 141 and the Y electrodes 143 varies according to whether or not a touch occurs. A touch position can be sensed by reading such a variation in capacitance and a variation in current output from the Y electrodes 143.

In this case, sequential voltage application to the X electrodes 141 and current detection at the Y electrodes 143 are accomplished in a single frame. Therefore, when touches occur at several positions simultaneously, the plurality of touches can be sensed.

Hereinafter, a method for manufacturing the touch panel embedded liquid crystal display device of the present invention will be described with reference to the drawings.

FIGS. 3A to 3F illustrate a method for manufacturing a touch panel embedded liquid crystal display device according to the present invention. FIGS. 4A and 4B illustrate the processes subsequent to FIG. 3C, when viewed in a direction rotated by 90 degrees.

Figure 3A:
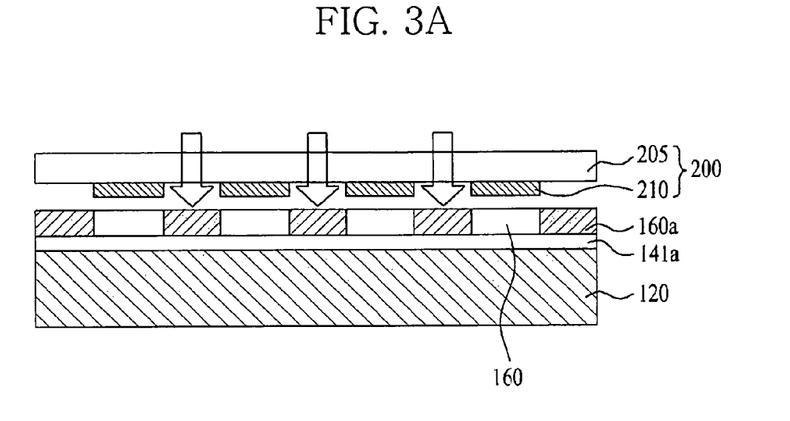
FIGS. 3A to 3F are sectional views illustrating a method for manufacturing a touch panel embedded liquid crystal display device according to the present invention.
Figure 4A:
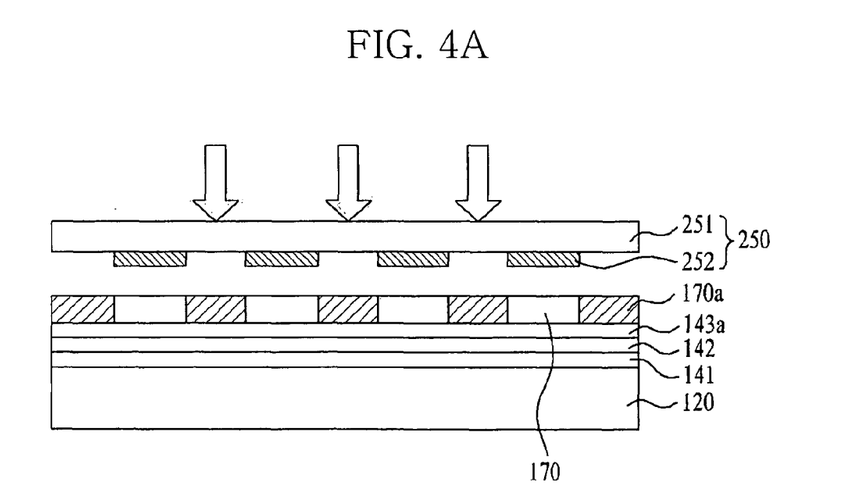
FIGS. 4A and 4B are sectional views illustrating the processes subsequent to FIG. 3C, when viewed in a direction rotated by 90 degrees.
Figure 4B:
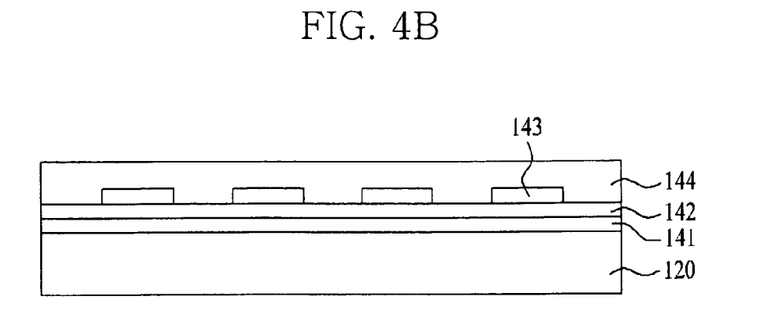

As shown in FIG. 3A, a first transparent electrode layer 141a is deposited over the entire surface of the second substrate 120.

After applying a first photoresist film 160 on the transparent electrode layer 141a, a first mask 200 in which light shielding portions 210 are defined at positions corresponding to X electrodes to be formed, is aligned on the first photoresist film 160. The first photoresist film 160 is exposed to light using the first mask 200. The exposure process denatures the first photoresist film 160. That is, portions of the first photoresist film 160, to which light is irradiated, are changed to denatured portions 160a which will be removed during a following developing process. In this case, the first mask 200 is configured such that a pattern corresponding to the light shielding portions 210 is formed on a transparent substrate 205 made of, for example, quartz.

Here, the first photoresist film 160 is of a positive type wherein a light receiving portion is removed via exposure and developing processes, and the first mask 200 is of a corresponding type. The first photoresist film 160 may be substituted with a negative type and accordingly, the first mask 200 may be of an inverted type wherein the light shielding portions 210 and openings of the above-described first mask 200 are inverted.

After completing the exposure process, the first mask 200 is removed from the second substrate 120.

Next, the first transparent electrode layer 141a is selectively removed using the first photoresist film 160 remaining after the developing process, forming the X electrodes 141.

Then, the remaining first photoresist film 160 is removed by stripping.

Figure 3B:
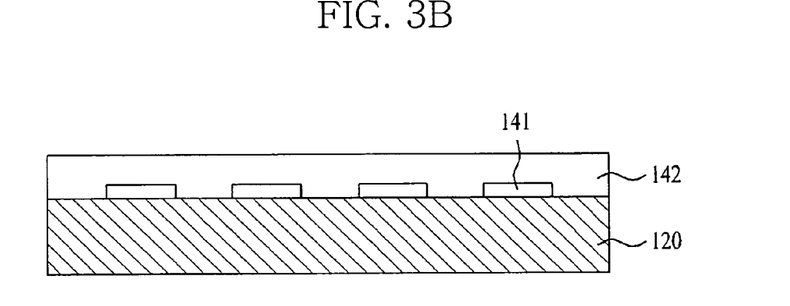

As shown in FIG. 3B, the first insulating film 142 is formed over the entire surface of the second substrate 120 including the X electrodes 141.

Figure 3C:
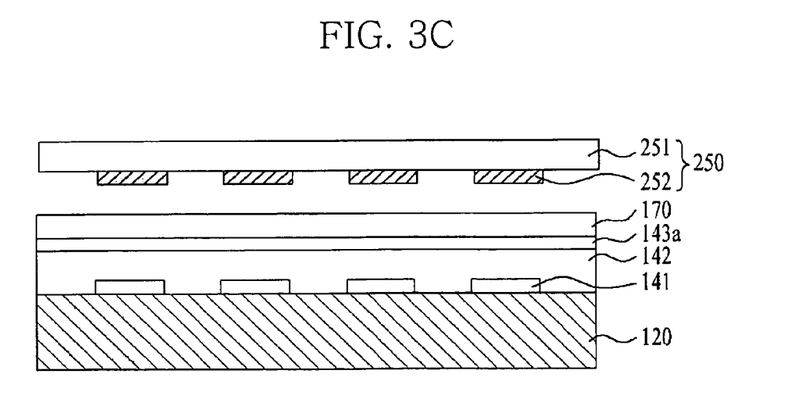

As shown in FIGS. 3C and 4A, a second transparent electrode layer 143a is formed over the entire surface of the first insulating film 142 and in turn, a second photoresist film 170 is formed over the entire surface of the second transparent electrode layer 143a. A second mask 250, in which light shielding portions 252 are defined at positions corresponding to Y electrodes to be formed, is aligned on the second photoresist film 170. In this case, the second mask 250 is configured such that a pattern corresponding to the light shielding portions 252 is formed on a transparent substrate 251 made of, for example, quartz.

FIG. 3C is a sectional view taken along a Y-axis direction crossing the X electrodes 141, and FIG. 4A is a sectional view taken along a longitudinal direction of the X electrodes 141, i.e. an X-axis direction orthogonal to FIG. 4A.

Similarly, the second photoresist film 170 is of a positive type wherein a light receiving portion is removed via exposure and developing processes, and the second mask 250 is of a corresponding type. The light shielding portions 252 of the second mask 250 are defined in a direction orthogonal to those of the first mask 200. Accordingly, as shown in FIG. 4A, when observed in an X-axis direction, exposed and developed portions can be observed.

The second photoresist film 170 may be substituted with a negative type and accordingly, the second mask 250 may be of an inverted type wherein the light shielding portions 252 and openings of the above-described second mask 250 are inverted.

After completing the exposure process, the second mask 250 is removed from the second substrate 120.

Next, the second transparent electrode layer 143a is selectively removed using the second photoresist film 170 remaining after the developing process, forming the Y electrodes 143.

Then, the remaining second photoresist film 170 is removed by stripping.

As shown in FIG. 4B, the second insulating film 144 having a flattened surface is formed over the entire surface of the first insulating film 142 including the Y electrodes 143. Since the Y electrodes 143 have a relatively thin thickness, the second insulating film 144 formed on the Y electrodes 143 can be easily flattened. Accordingly, the second insulating film 144 may be thinner than the first insulating film 142, or may be omitted. Here, when the second insulating film 144 is omitted, the color filter array 125 that will be described hereinafter may be directly formed on the first insulating film 142 on which the Y electrodes 143 are formed.

X electrodes 141, Y electrodes 143 and first insulating film 142 therebetween define the touch sensing part 140.

Figure 3D:
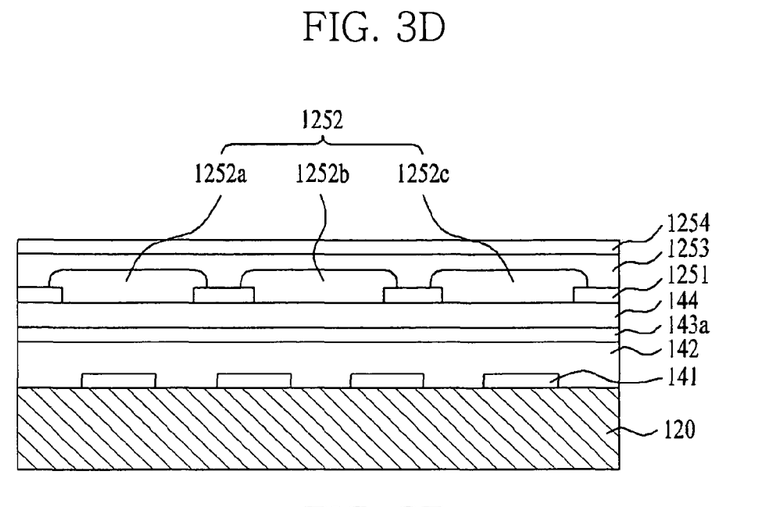

As shown in FIG. 3D, the black matrix layer 1251 is formed on the second insulating film 144, to correspond to the boundary of the respective pixel regions.

Next, a red, green, and blue (RGB) color filter layer 1252 (Red filter: 1252a, Green filter: 1252b and Blue Filter: 1252c) is formed to correspond to the respective pixel regions while partially overlapping the black matrix layer 1252.

Next, the overcoat layer 1253 is formed over the entire surface of the second insulating film 144 including the black matrix layer 1252 and RGB color filter layer 1252, to flatten the entire surface.

Next, the common electrode 1254 is formed on the overcoat layer 1253.

Here, the black matrix layer 1251, color filter layer 1252, overcoat layer 1253 and common electrode 1254 define the color filter array 125.

As described above, the touch sensing part 140 and color filter array 125 are sequentially formed on the second substrate 120, preparing the color filter array substrate 1200.

To correspond to the color filter array substrate 1200, the thin film transistor array substrate 1100 is prepared.

The thin film transistor array substrate 1100 includes the first substrate 110 and the thin film transistor array 115 formed on the first substrate 110.

Although not illustrated in detail, the thin film transistor array 115 consists of gate lines (not shown) and data lines (not shown) intersecting each other to define pixel regions while corresponding to the black matrix layer 1251, pixel electrodes (not shown) formed in the respective pixel regions, and thin film transistors (not shown) formed at intersections of the gate lines and data lines.

Thereafter, liquid crystals are loaded on the thin film transistor array substrate 1100 or color filter array substrate 1200.

Figure 3E:
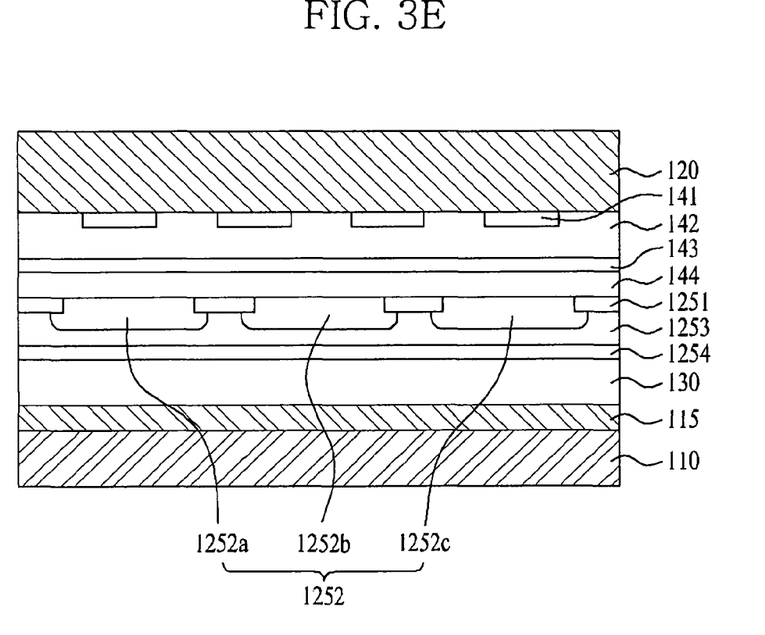

As shown in FIG. 3E, after inverting the substrate 1100 or 1200 on which no liquid crystals are loaded, the thin film transistor array substrate 1100 and color filter array substrate 1200 are arranged opposite each other.

As the loaded liquid crystals spread in a space between the thin film transistor array substrate 1100 and the color filter array substrate 1200, the liquid crystal layer 130 is formed.

Figure 3F:
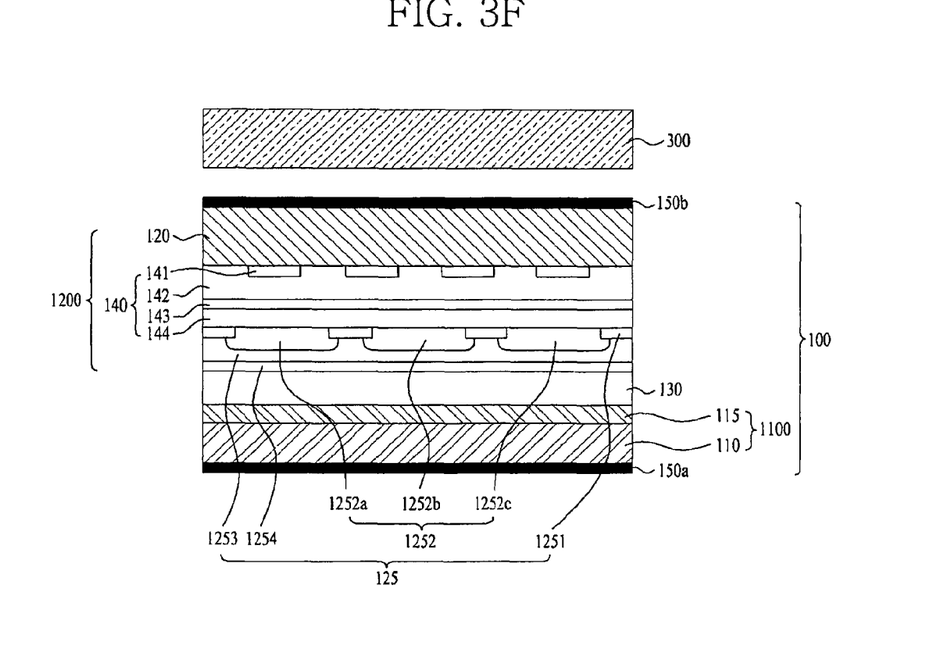

As shown in FIG. 3F, the first and second polarizers 150a and 150b are formed at the rear surfaces of the thin film transistor array substrate 1100 and color filter array substrate 1200, respectively.

Next, the cover glass 300 is attached to the top of the second polarizer 150b. The cover glass 300 serves to prevent breakage or other damages to the liquid crystal panel when external pressure is applied to the liquid crystal panel. If the second substrate 120 has sufficient durability against external pressure, the cover glass 300 may be omitted.

FIG. 5 is a plan view illustrating an upper substrate provided in the touch panel embedded liquid crystal display device according to the present invention.

As shown in FIG. 5 the plurality of X electrodes 141 and Y electrodes 143 are arranged to intersect each other and each of the X electrodes 141 and Y electrodes 143 are spaced apart from one another by the same distance for sensing based on a regular arrangement.

The second substrate 120 is provided with voltage applying pads 180 corresponding to the respective X electrodes 141 and voltage detecting pads 183 corresponding to the respective Y electrodes 143. The X electrodes 141 and Y electrodes 143 are connected with the pads 180, 183 via connecting lines 185.

The connecting lines 185 and the respective pads 180, 183 are formed at an inner surface of the second substrate 120 together with the X electrodes 141 and Y electrodes 143. Referring to FIG. 5, the pads 180, 183 are formed at a surface of the second substrate 120 facing the first substrate 110 and are connected with the Flexible Printed Cable (FPC) touch panel signal controller (320, see FIG. 7) which is connected with a system controller to apply electrical signals.

Figure 6B:
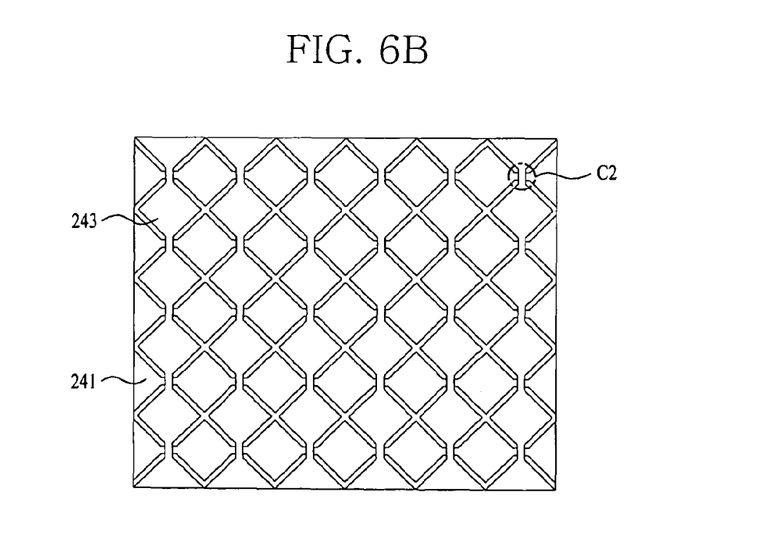

FIGS. 6A and 6B are plan views illustrating a modified embodiment of X and Y electrodes.

FIG. 6A illustrates the enlarged intersection of the X electrode 141 and Y electrode 143 of FIG. 5 as described above. To reduce an area of the intersection of the X electrode 141 and Y electrode 143, the width of the X electrode 141 is reduced at a region of the X electrode 141 overlapping the Y electrode 143.

In the case of the touch panel embedded liquid crystal display device of the present invention, a variation in capacitance between the X electrode 141 and the Y electrode 143 at a touch point is detected, to sense a touch position. In this case, when the intersection of the X electrode 141 and the Y electrode 143 has a large area, the intersection suffers from an increased load, making it difficult to detect the variation in capacitance. To solve this problem, the width of the X electrode 141 is reduced at the intersection C1 of the X electrode 141 and the Y electrode 143. Although the reduced width of the X electrode 141 is illustrated, as another embodiment, the width of the Y electrode 143 may be reduced.

In a modified form shown in FIG. 6B, an X electrode 241 and a Y electrode 243 have the same area and are reduced in width at an intersection C2 thereof, respectively, to minimize the occurrence of a load upon detection of a capacitance. Although the X and Y electrodes 241 and 243 are illustrated as having a diamond shape, other modified shapes are also possible if the X electrode and Y electrode occupy the same area on the second substrate 120.

Figure 7:
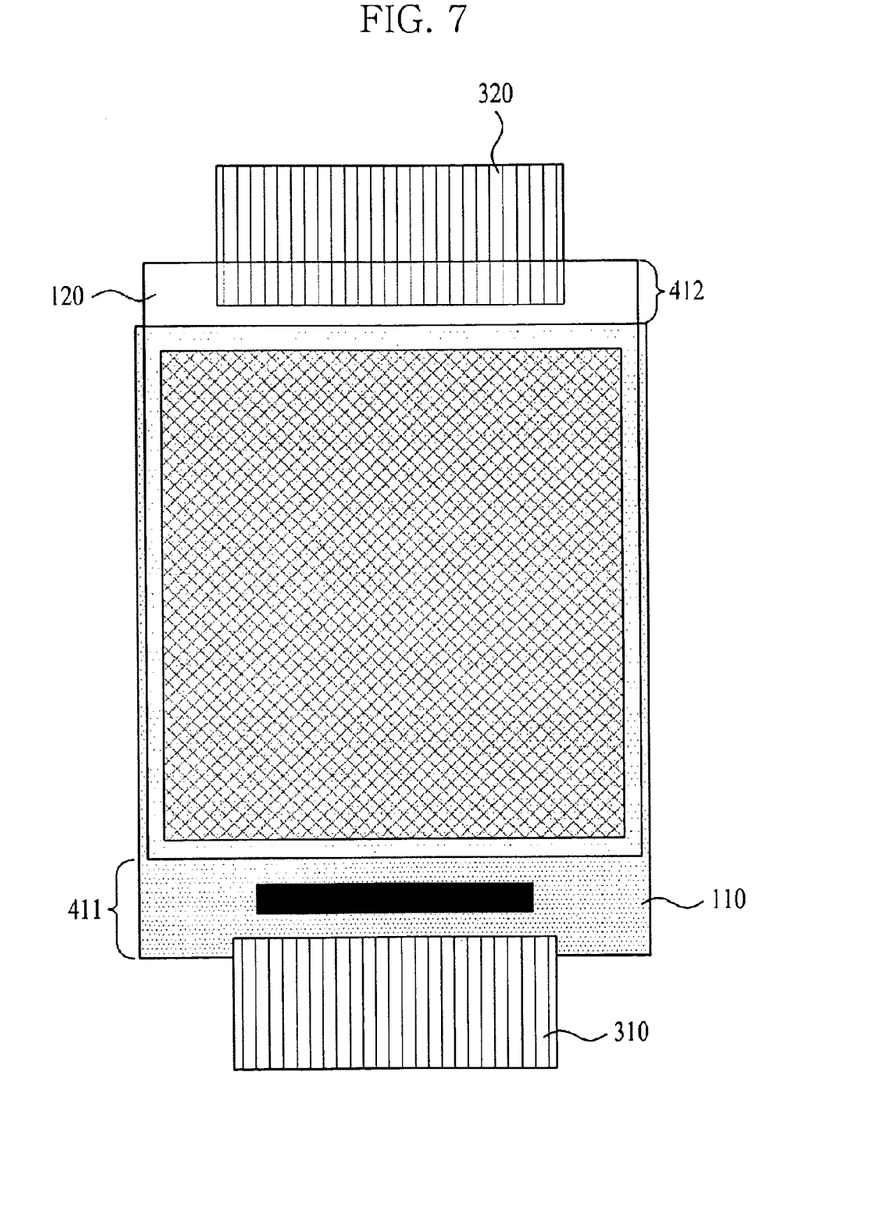
FIG. 7 is a plan view illustrating a connection relationship with signal applicators and upper and lower substrates bonded to each other.

FIG. 7 is a plan view illustrating a connection relationship between signal applicators and upper and lower substrates bonded to each other.

As shown in FIG. 7, in the touch panel embedded liquid crystal display device of the present invention, the first substrate 110 and second substrate 120 are bonded to each other such that they protrude from opposite sides thereof, respectively, rather than completely overlapping each other. Here, a region protruding from the first substrate 110 is called a first region (411), and a region protruding from the second substrate 120 is called a second region (412).

The image signal applicator 310 is connected to an edge of the first region protruding from the first substrate 110, to apply signals to the thin film transistor array 151. The touch panel signal controller 320 is connected to an edge of the second region protruding from the second substrate 120, to apply signals to the touch sensing part. In this case, the touch panel signal controller 320 is connected with the voltage applying pads and voltage detecting pads 180 as described above. The image signal applicator 310 is connected with gate line pad portions and data line pad portions formed on the first substrate 110.

Referring to FIG. 7, the image signal applicator 310 and touch panel signal controller 320 are made of FPCs and are foldable to an underside of the first substrate 110. The second region 412 contains the voltage applying pads 180 to apply voltage signals to the X electrodes 141 and the voltage detecting pads 183 to detect signals output from the Y electrodes 143, which are connected to the X electrodes 141 and Y electrodes 143 of the touch sensing part 140 via the connecting lines 185. The voltage applying pads 180 and voltage detecting pads 183 are connected with the touch panel signal controller 320.

The image signal applicator 310 and touch panel signal controller 320 are made of soft FPCs and are foldable to a downside of a liquid crystal module upon mounting thereof.

Figure 8:
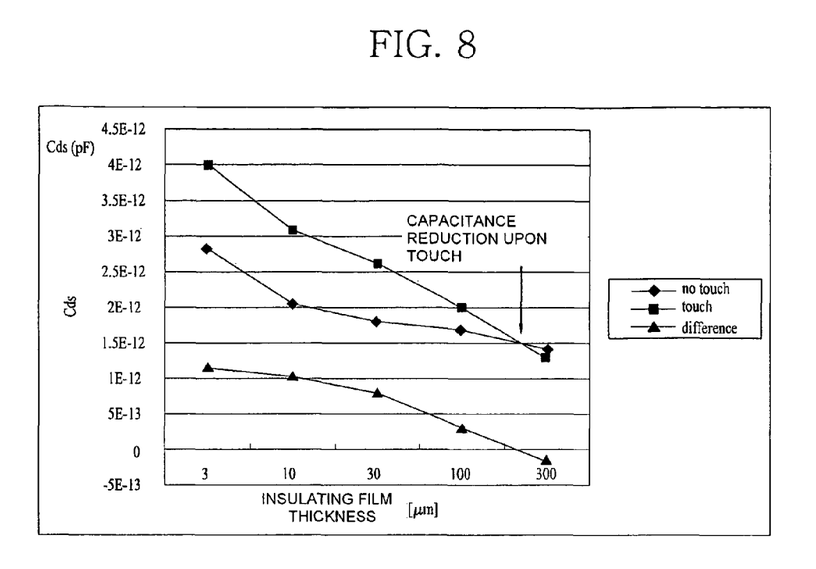
FIG. 8 is a graph illustrating a capacitance variation between X and Y electrodes according to the thickness of an insulating film between the two electrodes.

FIG. 8 is a graph illustrating a capacitance variation between an X electrode and a Y electrode according to the thickness of an insulating film between the two electrodes.

FIG. 8 illustrates a capacitance value that is variable according to the thickness of the first insulating film between X and Y electrodes. It was observed that as the thickness of the first insulating film increases, differentiating between a touch state and no-touch state becomes increasingly difficult. If the thickness of the first insulating film excessively increases, there is a risk that a capacitance upon a no-touch state exceeds a capacitance upon a touched state. Accordingly, the thickness of the first insulating film is determined within a range not causing the reversion of a capacitance.

In the graph of FIG. 8, if the thickness of the insulating film between the two electrodes exceeds 300 µm, it causes the reversion of a capacitance and thus, is unusable. Accordingly, the thickness of the insulating film must be less than 100 µm, in consideration of a reduction in product thickness. Further, a capacitance variation before and after a touch must be more than a predetermined value (experimentally, a capacitance difference between a touch state and a no-touch state must be more than 30 femtofarads) to enable discrimination of a touch. Accordingly, in the touch panel embedded liquid crystal display device of the present invention, the thickness of the first insulating film between the X electrode and the Y electrode is set to a range of 0.1~5 µm.

Meanwhile, although the above description is based on the insulating film between the X and Y electrodes being an organic insulating film, an inorganic insulating film such as a nitride film and an oxide film may be used if a capacitance difference between a touch state and a no-touch state is more than a predetermined level (30 femtofarads).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, a touch panel embedded liquid crystal display device according to the present invention has the following effects.

Cellular phones, PMPs and the like using a liquid crystal panel require a reduction in thickness in consideration of special use environments. In the case of a capacitive touch panel, the thickness of the entire module is determined to a total thickness of at least a cover glass, liquid crystal module, touch part and polarizers. However, the touch panel embedded liquid crystal display device of the present invention includes an insulating film between X electrodes and Y electrodes formed on a color filter array substrate, whereby a touch sensing part can be integrally formed in a liquid crystal panel via two mask processes for the X electrodes and Y electrodes on the color filter array substrate.

Accordingly, the touch panel embedded liquid crystal panel can be fabricated to a thinner thickness than a touch panel attached type, resulting in a reduction in the thickness of the liquid crystal display device. Such a so-called In-Cell configuration may be advantageous in the terms of a physical thickness while achieving advantages of a multi-touch type panel.

In addition, an adhesive layer for attachment between a touch panel and a liquid crystal panel can be omitted, and any damage due to misalignment of both the panels can be prevented, enabling fabrication of a touch panel integrated liquid crystal panel with a reduced rate of defective products. In conclusion, omitting the attachment process can reduce process costs and time, contributing to an improvement in production yield.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a first and a second substrate opposite each other;
a thin film transistor array formed on the first substrate;
a touch sensing part directly formed on an inner surface of the second substrate including:
   a plurality of transparent X electrodes spaced apart from each other by a predetermined distance,
   a plurality of transparent Y electrodes orthogonally intersecting the X electrodes, and
   a first transparent insulating film between the X electrodes and the Y electrodes;
a second transparent insulating film on the touch sensing part;
a color filter array formed on the second transparent insulating film, wherein the color filter array including a color filter layer and a black matrix on the second transparent insulating film; and
a liquid crystal layer formed between the thin film transistor array and the color filter array,
wherein the first and second transparent insulating films are organic insulating film and the second transparent insulating film is thinner than the first transparent insulating film;
wherein the first substrate and the second substrate include a first region and a second region, respectively, defined in a projected side region, the first region and the second region facing each other;
wherein an image signal applicator to apply signals to the thin film transistor array is connected with the first region on the first substrate, and a touch panel signal controller to perform voltage application and signal detection with respect to the X electrodes and Y electrodes of the touch panel is connected with the second region of the inner surface of the second substrate; and wherein the image signal applicator and the touch panel signal controller are made of Flexible Printed Cables (FPCs), and are foldable to an underside of the first substrate, wherein the second region of the second substrate includes:
- a plurality of voltage applying pads to apply voltage signals to the X electrodes; and
- a plurality of voltage detecting pads to detect signals output from the Y electrodes,
- wherein only one end of each of the X electrodes and Y electrodes is connected to any one of the voltage applying pads and the voltage detecting pads; and the voltage applying pads and the voltage detecting pads are connected with the touch panel signal controller.

2. The device according to claim 1, wherein the X electrodes are bar-shaped electrodes elongated in a first direction, and the Y electrodes are bar-shaped electrodes elongated in a second direction to intersect with the X electrodes.

3. The device according to claim 1, wherein at least one of the X electrodes and the Y electrodes has a thinner width, at the intersections of the X electrodes and the Y electrodes, than a remaining region thereof.

4. The device according to claim 1, wherein the first transparent insulating film has a thickness of 0.1~5 μm.

5. The device according to claim 1, wherein the X electrodes and the Y electrodes are made of any one of Indium Tin Oxide (ITO), Indium Zinc Oxide (IZO) and Indium Tin Zinc Oxide (ITZO).

* * * * *